INVENTOR
ROBERT J. EMINGER
BY Wood, Gust & Irish
ATTORNEYS

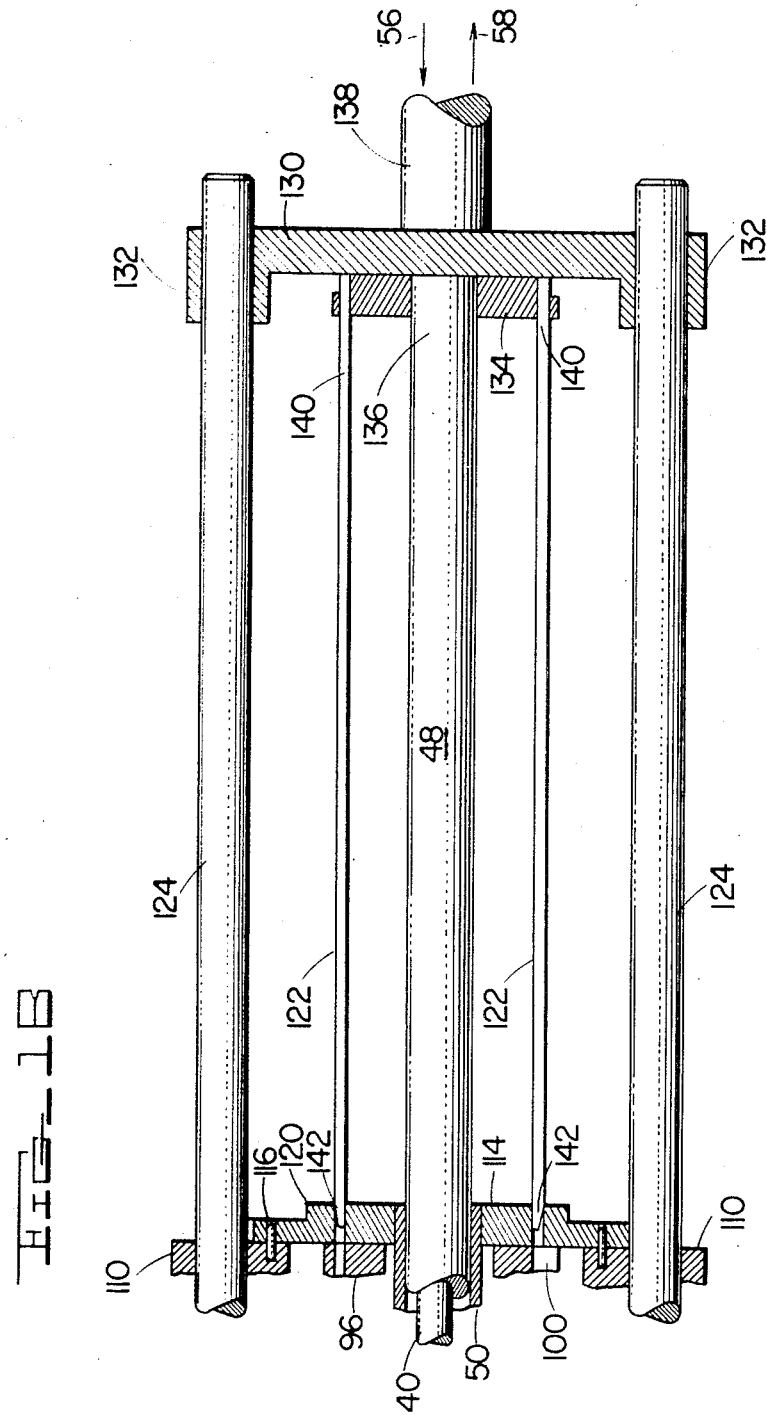

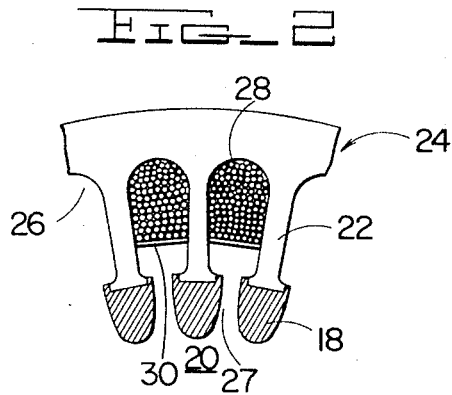
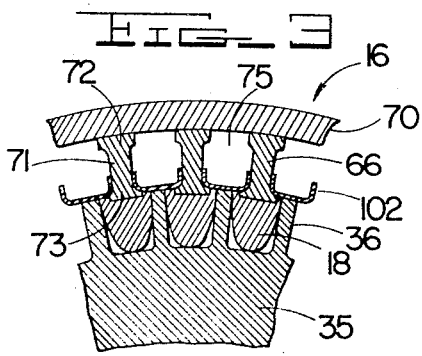
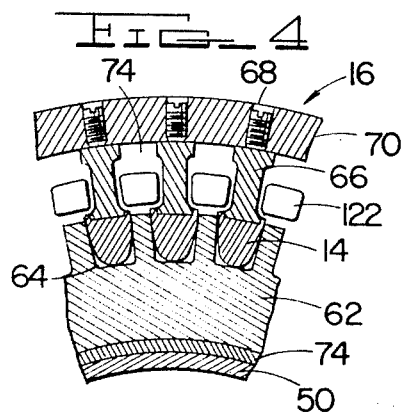

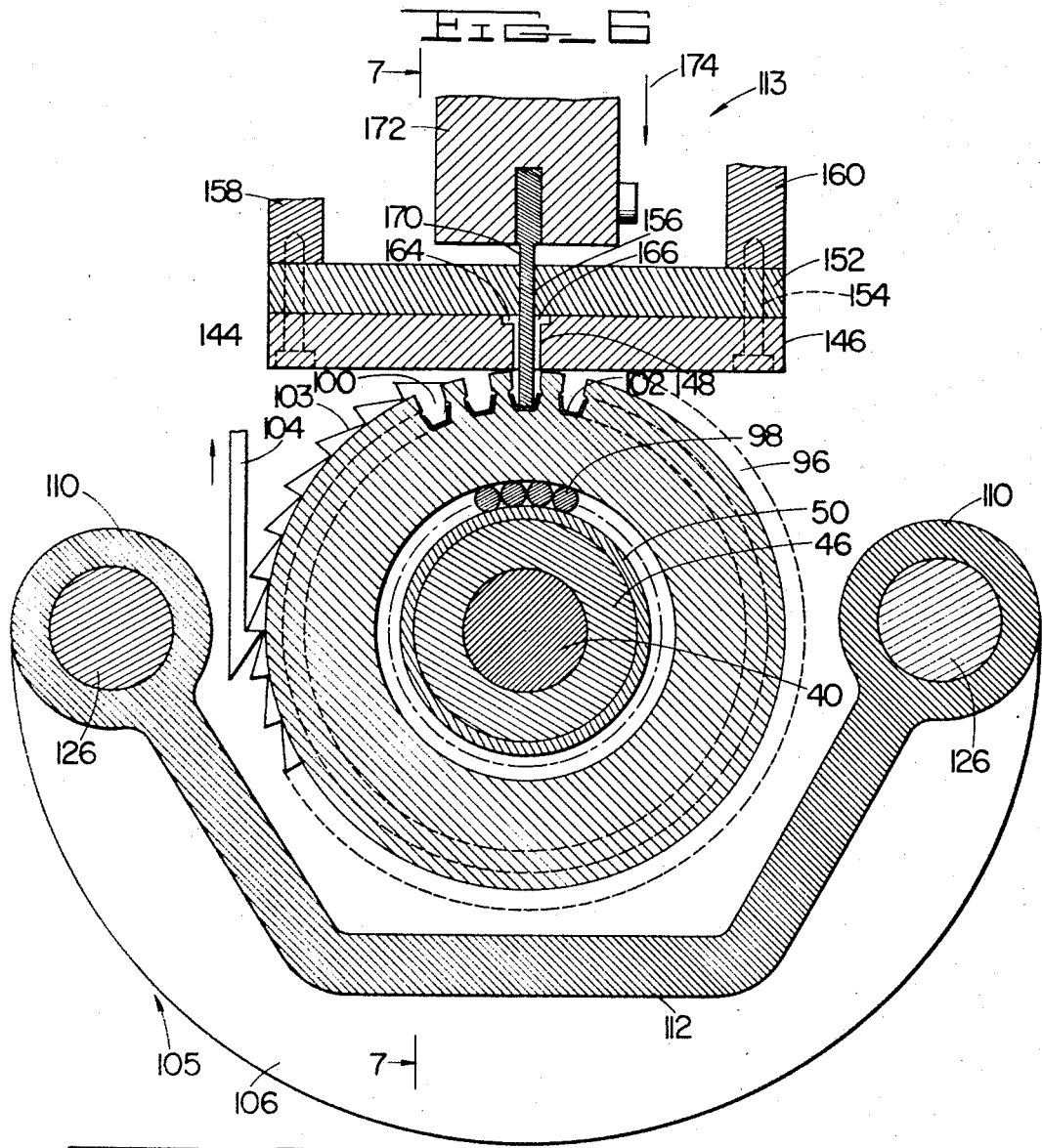
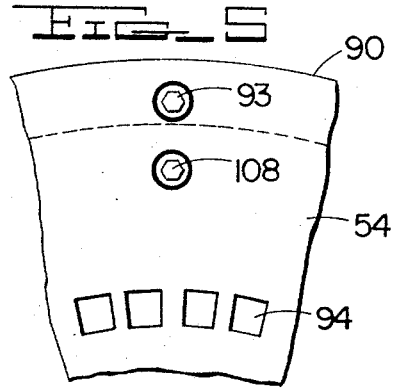

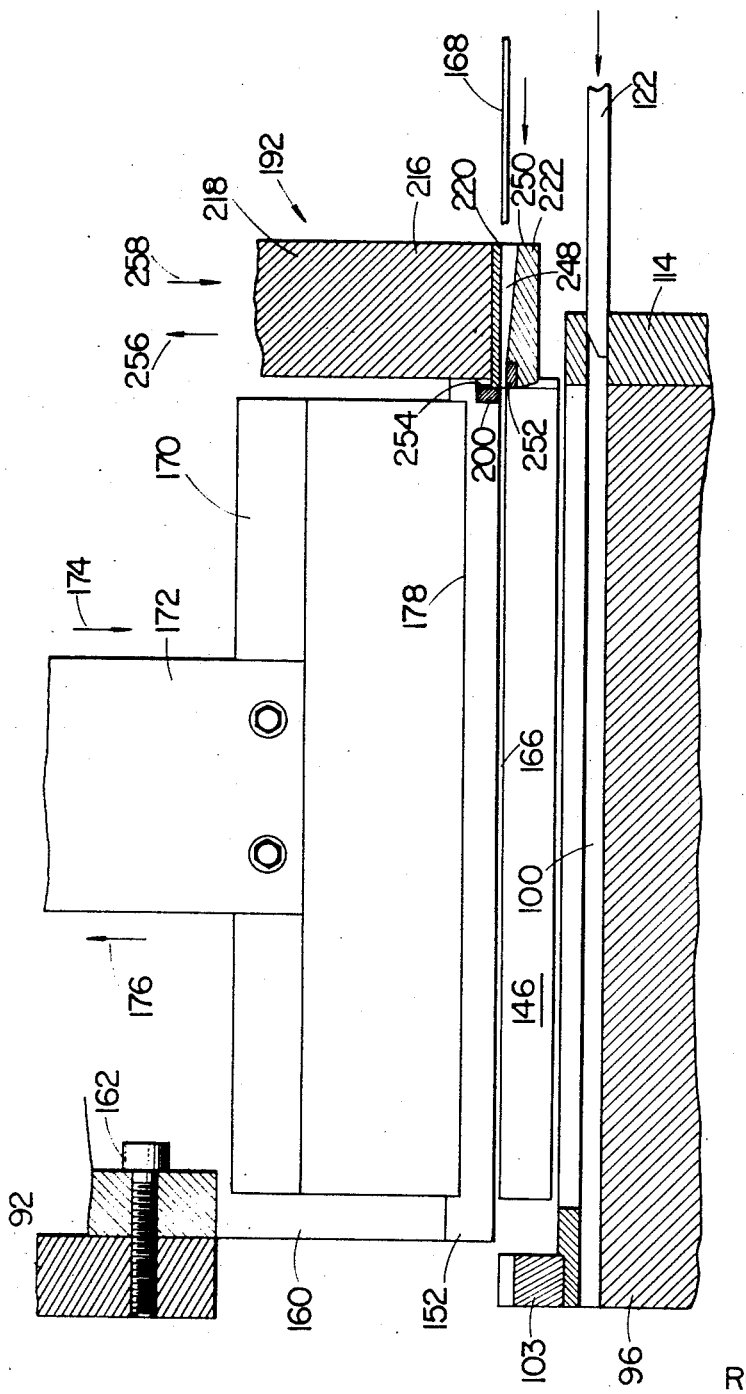

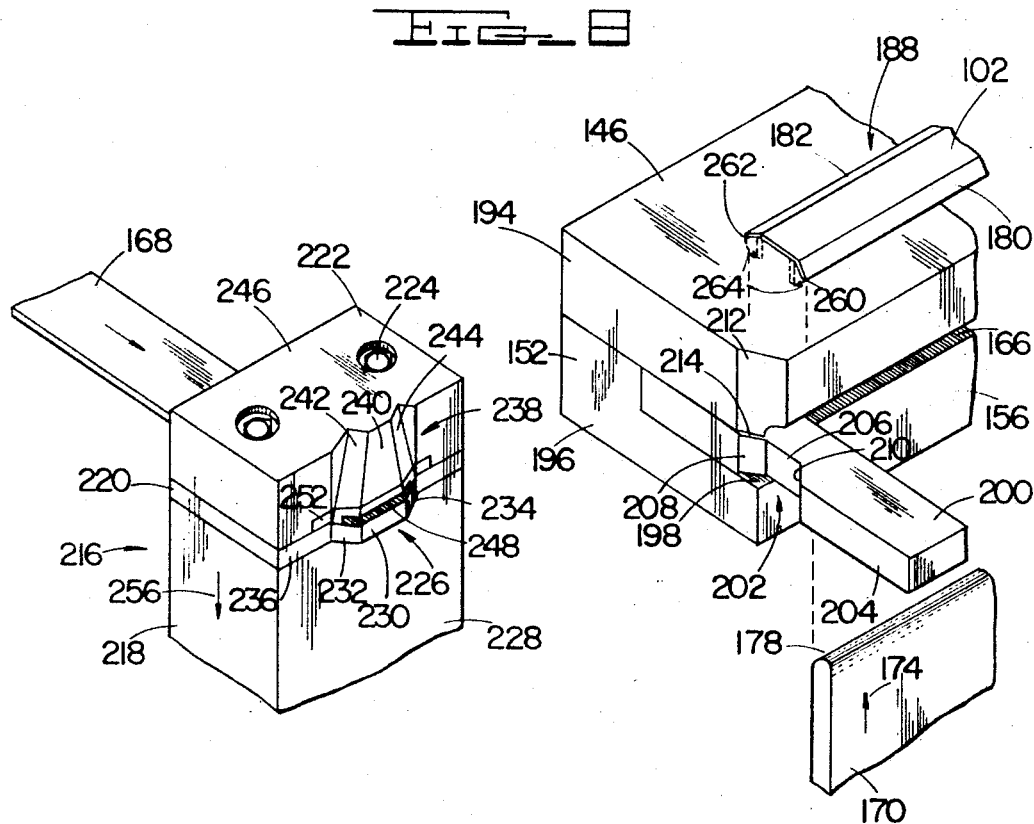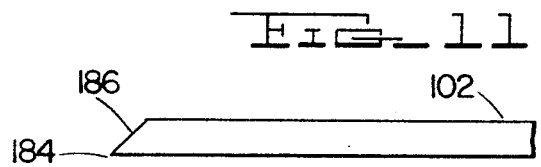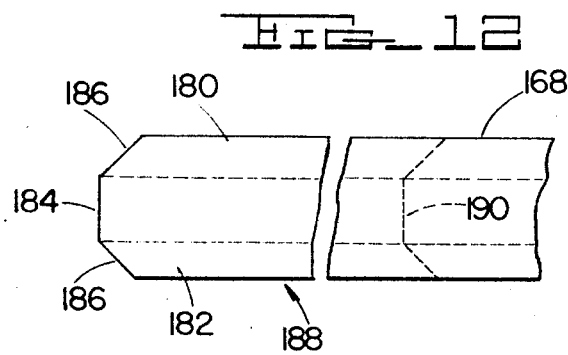

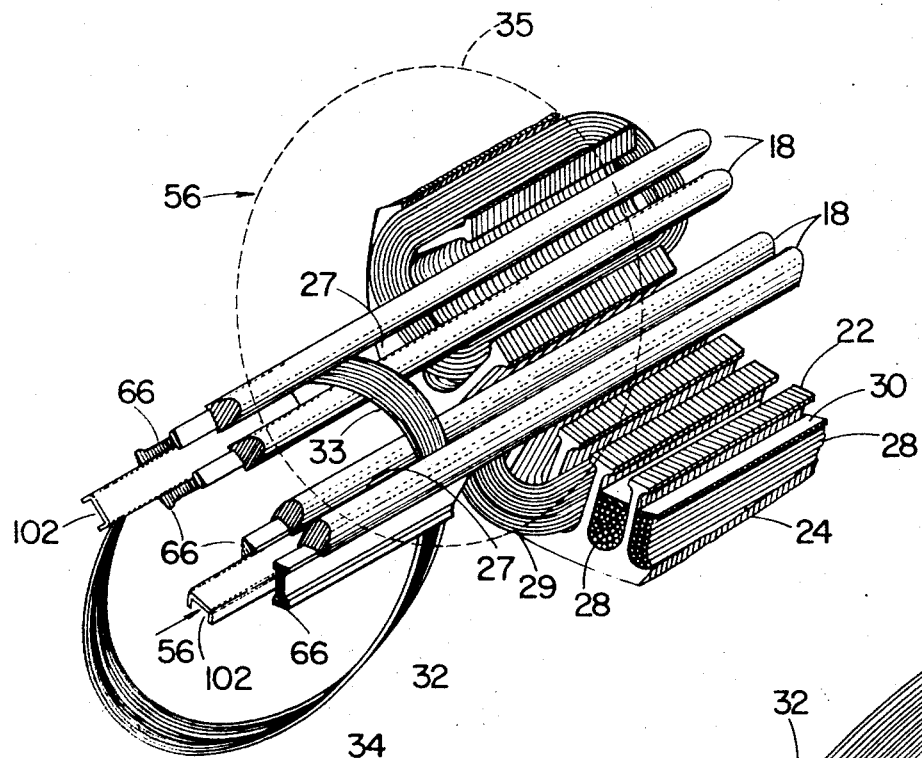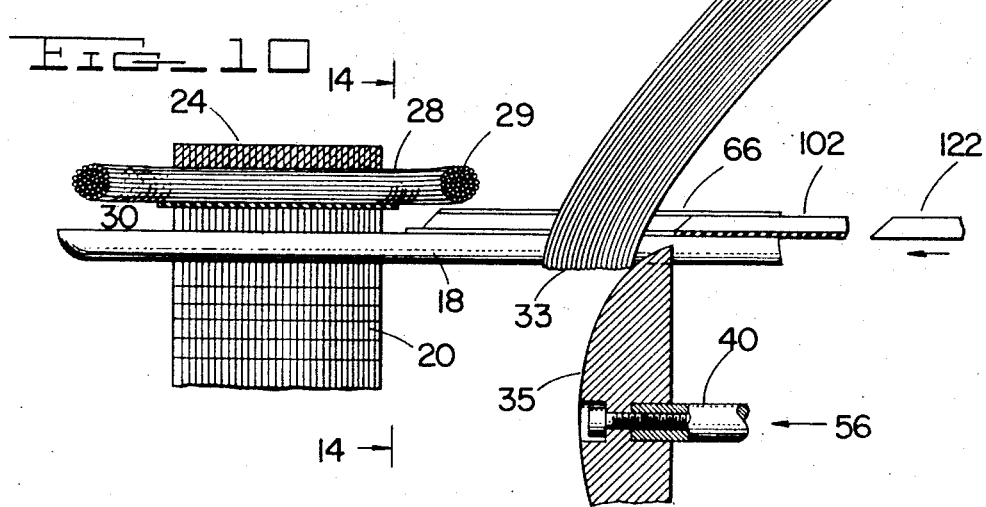

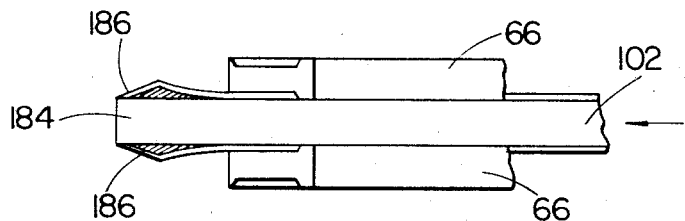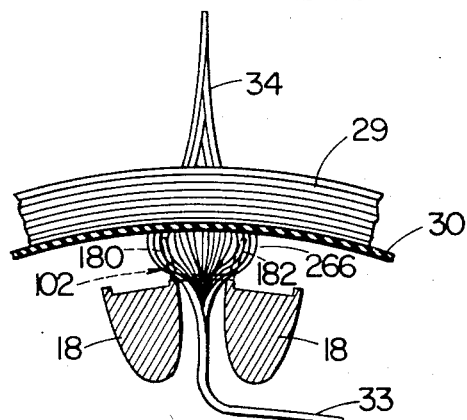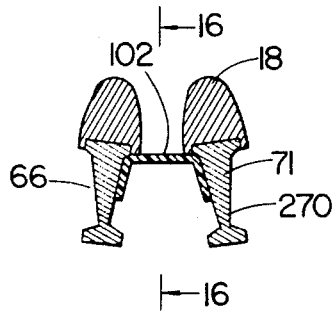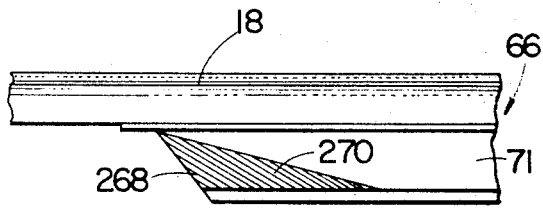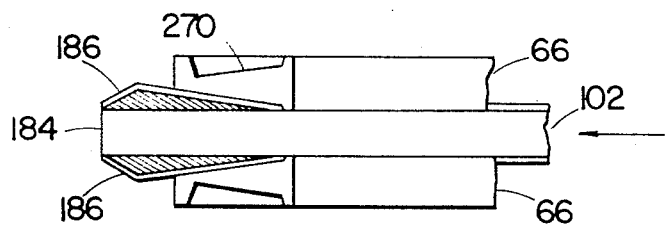

United States Patent Office 3,447,225
Patented June 3, 1969

3,447,225
APPARATUS AND METHOD FOR INSERTING DYNAMOELECTRIC MACHINE COILS AND SLOT WEDGES
Robert J. Eminger, Fort Wayne, Ind., assignor to Fort Wayne Tool & Die, Inc., Fort Wayne, Ind., a corporation of Indiana
Filed July 8, 1966, Ser. No. 567,035
Int. Cl. H02k 15/04, 15/085
U.S. Cl. 29—205                                   8 Claims

ABSTRACT OF THE DISCLOSURE

This disclosure relates to apparatus for inserting prewound coils and slot wedges into the slots of a dynamoelectric machine core member, wherein said wedges are formed by forming means prior to insertion into said slots.

---

This invention relates generally to apparatus and methods for inserting prewound coils and slot wedges into the slots of an internally slotted dynamoelectric machine core member.

In Patent No. 2,432,267 granted Dec. 9, 1947 to A. P. Adamson, there is disclosed an apparatus and method for inserting prewound coils into the slots of an internally slotted dynamoelectric machine core member. Apparatus has been provided in accordance with the Adamson patent which also inserts slot wedges into the core member slots over the coils positioned therein. In the fabrication of the stator members of certain types of dynamoelectric machines such as single phase induction motors, it is necessary to provide both main and auxiliary or starting windings, the coils comprising these windings occupying the same slots of the stator core member in conventional distributed winding arrangements; the coils comprising the main windings are conventionally wound or positioned in the slots first with the coils comprising the auxiliary or starting windings being thereafter wound or positioned in the slots over the main winding coils.

In employing the above-referred to apparatus in accordance with the Adamson patent for inserting the coils comprising auxiliary or starting windings in the core member slots over the coils comprising the main windings and simultaneously therewith inserting slot wedges into the core member slots over the coils comprising the auxiliary windings, in particular where substantial slot fill is involved, it has been found that the conventional straight ended slot wedges tend to enter between one or more outer wires of the coils comprising the auxiliary winding so that when the wedge is completely inserted, one or more wires remain on top of the wedge, an intolerable situation since such unconfined wires may extend into the bore and engage the rotor therein.

In such apparatus, a plurality of elongated finger members are provided adapted to extend through the bore of the stator core member and respectively to engage the inner extremities of the teeth which define the slots in the core member. The coils to be inserted in the stator core member slots are prewound in skein fashion and are positioned on the fingers with an end turn portion of each coil extending across the bore defined by the fingers and with the side portions extending radially outwardly through the spaces defined by respective pairs of the fingers. Thus, when the stator core member is positioned on the finger members, the one end turn portion of each coil is in alignment with the bore of the core member and the side portions are in alignment with the respective pair of slots but are inclined outwardly and rearwardly with respect thereto and with respect to the axis of the bore.

The slot wedges to be inserted axially in the core member slots over the coils are positioned in axial alignment with the slots and side portions of the coil on the side of the coil removed from the core. The coils and slot wedges are then simultaneously moved axially in a direction toward the core so that the one end turn enters the bore and the side portions radially enter the slots, the slot wedges following immediately behind the coils and thus axially entering the slots over the side portions. It has been observed that when coils comprising auxiliary or starting windings are thus inserted, the end turns of the previously inserted main windings which extend axially beyond the core engage the side portions of the coils being inserted tending to flatten them with the result that the corners of the leading ends of the conventional straight ended slot wedges tend to enter between the thus spread wires of the side portions of the coil, as aforesaid. Furthermore, in the case of stators having phase slot insulation placed over the main windings for insulating the main and auxiliary windings, and particularly in the case of two pole motors having phase slot insulation, the square corners of the conventional straight ended slot wedges tend to engage the phase slot insulation and to push it out of the slots as the slot wedges are inserted therein.

It is therefore desirable to provide an apparatus and method of the general type shown in the aforesaid Adamson patent for simultaneously inserting prewound coils and slot wedges into the slots of an internally slotted dynamoelectric machine core member in which provision is made for eliminating the above-described tendency for the slot wedges to dig into the wires of coils inserted over previously inserted coils. I have found that this tendency, which has previously required manual reworking of as many as 8 out of 10 stators, is substantively completely eliminated by the employment of slot wedges having tapered leading ends.

It is therefore an object of this invention to provide an improved apparatus and method for inserting prewound coils and slot wedges into the slots of an internally slotted dynamoelectric machine core member.

Another object of the invention is to provide an improved apparatus and method for inserting prewound coils and slot wedges into the slots of an internally slotted dynamoelectric machine core member wherein entry of the slot wedges between the wires of the coils in the slots resulting in unconfined wires over the slot wedges is inhibited.

The above-mentioned and other features and objects of this invention and the matter of attaining them will become more apparent and the invention itself will be best understood by reference to the following description of an embodiment of the invention taken in conjunction with the following drawings wherein:

FIGS. 1A and B jointly show a side view, partly in cross-section and partly broken away, of one embodiment of the invention;

FIG. 2 is a fragmentary, cross-sectional view taken generally along the lines 2—2 of FIG. 1A;

FIG. 3 is a fragmentary, cross-sectional view taken generally along the lines 3—3 of FIG. 1A;

FIG. 4 is a fragmentary, cross-sectional view taken generally along the lines 4—4 of FIG. 1A;

FIG. 5 is a fragmentary, cross-sectional view taken generally along the lines 5—5 of FIG. 1A;

FIG. 6 is a fragmentary, cross-sectional view taken generally along the lines 6—6 of FIG. 1A;

FIG. 7 is a fragmentary, cross-sectional view taken generally along the lines 7—7 of FIG. 6;

FIG. 8 is a fragmentary exploded view showing the slot wedge cut-off and forming mechanism of the invention in greater detail;

FIG. 9 is a fragmentary view in perspective, partly broken away, further showing the apparatus and method of the invention;

FIG. 10 is a fragmentary, cross-sectional view further showing the method and apparatus of the invention;

FIG. 11 is a side view of the tapered slot wedge used in the method and apparatus of the invention;

FIG. 12 is a top view of the strip of insulating material from which the slot wedge used in the method and apparatus of the invention is formed;

FIG. 13 is a fragmentary top view showing the forward ends of a pair of wedge guides with a slot extending therefrom;

FIG. 14 is a fragmentary, cross-sectional view taken generally along the lines 14—14 of FIG. 10;

FIG. 15 is a fragmentary, cross-sectional view taken generally along the lines 15—15 of FIG. 1A; and showing a modification of the wedge guides of the invention;

FIG. 16 is a fragmentary, side view taken generally along the lines 16—16 of FIG. 15; and FIG. 17 is a fragmentary top view of the modified wedge guides of FIGS. 15 and 16 with a slot wedge extending therefrom.

Figure 1A:
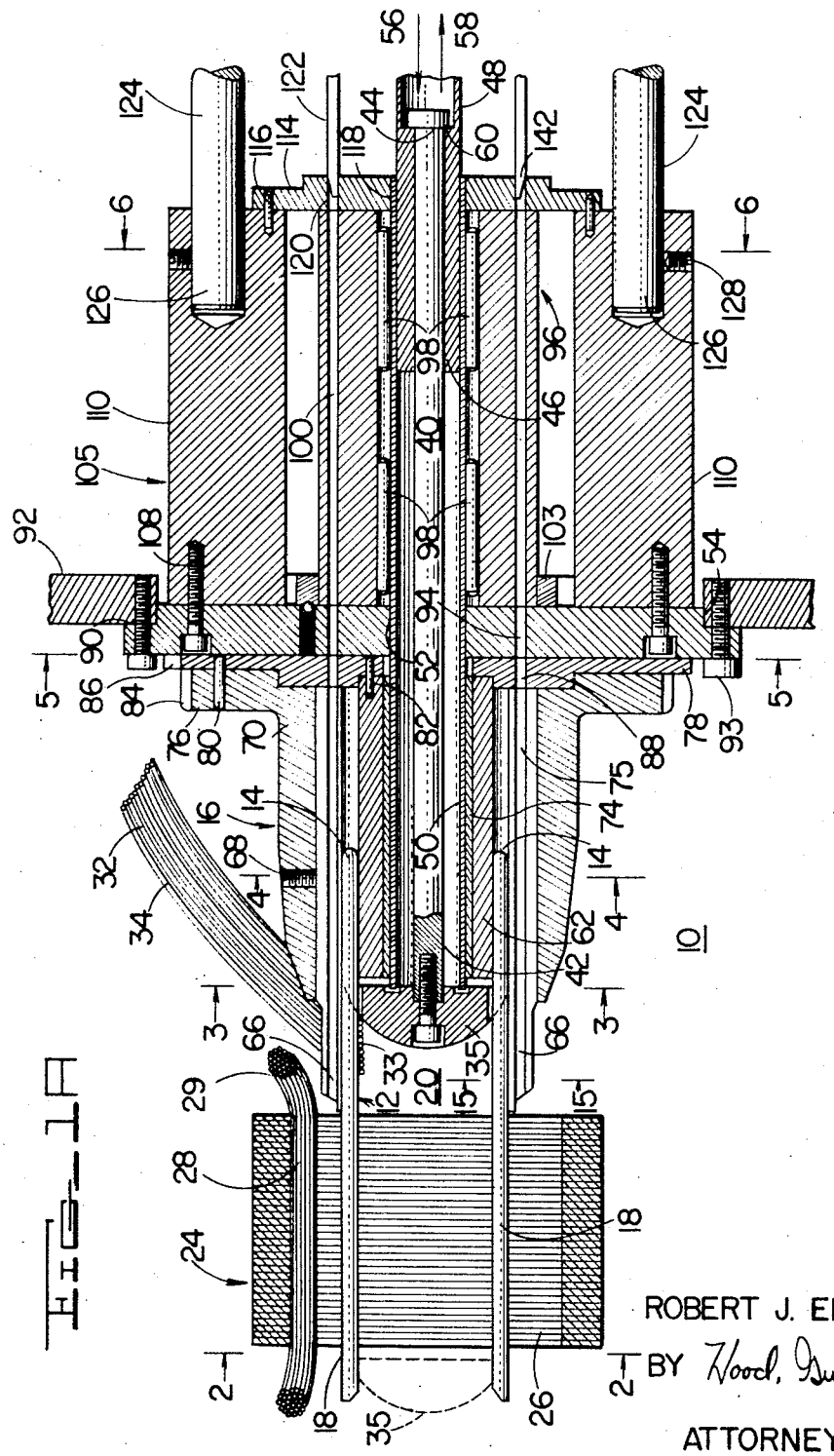

Referring now to the figures of the drawings, the improved coil and slot wedge inserting apparatus of the invention, generally indicated at 10, comprises a plurality of elongated finger elements 12 having their inner ends 14 secured in a mounting assembly 16 and having extension portions 18 which extend axially outwardly from the mounting assembly 16. Extension portions 18 are radially spaced apart to define a bore 20 and respectively engage teeth 22 of stator core member 24 which define winding slots 26 therebetween, as best seen in FIG. 2. Thus, axially extending spaces 27 between the extension portions 18 of the finger elements 12 respectively communicate with the slots 26 of the core member 24.

The stator core member 24 is shown as having a plurality of conventional windings 28 previously positioned in predetermined pairs of slots 26, either by the coil inserting apparatus of the present invention or by the other conventional winding apparatus; windings 28 may be the conventional main or running windings of a conventional single phase alterating current motor. It will be observed that the windings 28 only partially fill the respective slots 26, thus, leaving slot space in which other windings, such as auxiliary or starting windings, may be wound over the windings 28 as will be hereinafter described. Conventional phase insulators 30 may be positioned in the slots 26 over the windings 28 for electrically insulating the two windings in the respective slots, as is well known to those skilled in the art.

Extension portions 18 of the finger elements 12 are adapted to receive the prewound coils 32 to be inserted in the slots 26 of the core member 24 over the coils 28 therein, coils 32 being in skein form as best seen in FIG. 9. Each of the multi-turn skein-type coils 32 has one end turn portion 33 extending across the bore 20 and its side portions 34 extending outwardly through the spaces 27 between respective pairs of extension portions 18. It will be understood that the requisite number of prewound, multi-turn, skein-type coils 32 are positioned on the finger elements 12, following which the stator core member 24 with the windings 28 already positioned in slots 26 is positioned over the extension portions 18, as shown. Thus, the inner end turn portions 33 of the coils 32 are in axial alignment with the bore 20 of the core 32 and the side portions 34 are in axial alignment with the respective pair of core member slots 26 which are in axial alignment with the respective spaces 27 between the extension portions 18, the side portions 34, however, extending outwardly and upwardly away from the slots 26 and the axis of the bore 20.

A stripper member 35 is provided mounted for axial movement in the bore 20 between a position on the side of the stator core member 24 toward mounting assembly 16, as shown in solid lines in FIG. 1A, and a second position on the other side of the stator core member 24, as shown in dashed lines. Stripper member 35 has a plurality of projections 36 which respectively extend radially outwardly in the spaces 27 between the extension portions 18 of the finger elements 12, as best seen in FIG. 3. Axial movement of the stripper member 35 from the position shown in solid lines in FIG. 1A toward the position shown in dashed lines will move the end turn portions 33 of the coils 32 axially along the inner surfaces of the extension portions 18 and axially into the bore of the core member 24 with the side portions 34 which extend radially outwardly through the spaces 27 between the respective extension portions 18 thus progressively radially entering the respective core slots 26 so that, when the stripper member 35 reaches its extreme position as shown in dashed lines in FIG. 1A, the side portions 34 are completely positioned in the respective slots 26.

A push rod 40 is provided having one end 42 secured to the stripper 35 and having its other end 44 slidably connected with end 46 of sleeve member 48 by a lost-motion connection. Sleeve member 48 is slidably mounted for axial movement within bearing sleeve 50 which extends through central aperture 52 and mounting plate 54. Thus, axial movement of sleeve member 48 in the direction shown by the arrow 56 will result in engagement of end 46 with the stripper 35 thereby to move the stripper member 35 axially in direction 56 to insert the side portions 34 of coil 32 in the core slots 26, as above-described. Axial movement of the sleeve member 48 in the opposite direction, as shown by the arrow 58, will result in the engagement of shoulder 60 with end 44 of the push rod 40, thereby moving stripper member 35 axially in direction 58 to return it to its normal position, as shown in solid lines in FIG. 1A.

Mounting assembly 16 comprises a mounting member 62 having a plurality of axially extending slots 64 formed therein in which inner ends 14 of the finger elements 12 are respectively seated, as best seen in FIG. 4. A plurality of elongated, axially extending slot wedge guide elements 66 is provided respectively engaging the outer surfaces of the inner ends 14 of the finger elements 12. The slot wedge guide element 66 and finger elements 12 are respectively held in assembled relation by set screws 68 in housing member 70, as best seen in FIG. 4. Slot wedge guide elements 66 have a generally I-shaped cross section formed by web portions 71 and upper and lower flange portions 72, 73. Mounting assembly 16 comprising housing member 70 and mounting member 62 with the inner ends 14 of the finger elements 12 and slot wedge guide elements 66 clamped therein is rotatably mounted on sleeve member 50 by suitable bearing means 74.

Slot wedge guide elements 66 respectively define axially elongated wedge passages 75. It will be seen that with the finger elements 12 and the slot wedge guide elements 66 respectively in axial alignment with the teeth 22 of the core member 24, wedge passages 75 will also respectively be in axial alignment with the winding slots 26 of the core member 24.

Housing member 70 has a radially outwardly extending flange portion 76 having a plate member 78 secured thereto in any suitable manner, as by pins 80. Plate member 78 is likewise secured to mounting member 62 in any suitable manner as by pins 82. The outer periphery of the flange portion 76 may be provided with suitable external gear teeth 84 and the plate member 78 may be provided with suitable detent notches 86 whereby the entire mounting assembly 16, finger elements 12 and slot wedge guide elements 66 may be rotated by external apparatus (not shown) for indexing purposes. Plate member 78 has axially extending passages 88 formed therethrough respectively communicating with the wedge passages 75 defined between the wedge guide elements 66.

Mounting plate member 54 has a radially outwardly extending flange portion 90 for mounting the apparatus 10 in a suitable frame and housing, a portion of which is shown at 92, by means of suitable threaded fasteners 93. Mounting plate member 54 also has axially extending wedge passages 94 formed therethrough respectively communicating with the wedge passages 75, 88.

A wedge magazine 96 is provided rotatably mounted on sleeve member 50 by suitable needle bearings 98. Magazine 96 has a plurality of outwardly facing, axially extending slots 100 formed in its outer periphery in which the slot wedges 102 are loaded and initially retained, as will hereinafter be more fully described. Slot wedge receiving openings 100 are respectively in axial alignment with the slot wedge passages 75, 88 and 94. Magazine 96 is provided with suitable ratchet teeth 103 by which the magazine may be rotated by means of a suitable ratchet mechanism 104 so that the slot wedges 102 may be successively loaded in the slots 100, as will hereinafter be described.

A yoke member 105 is provided having a flange portion 106 secured to the mounting plate member 54 in any suitable manner, as by studs 108. Yoke member 105 includes a pair of transversely spaced-apart boss elements 110 connected by a web portion 112. Reference to FIG. 6 will reveal that the magazine member 96 is disposed between the boss elements 110 with the wedge receiving slots 100 thus disposed for loading the slot wedges 102 therein by means of the slot wedge forming and loading apparatus 113 to be hereinafter more fully described. A rear mounting plate 114 extends across yoke member 105, being secured thereto in any suitable manner, as by suitable pins 116. The rear end of bearing sleeve member 50 is supported in opening 118 in the rear mounting plate 114. Rear mounting plate 114 has a plurality of openings 120 formed therethrough for accommodating slot wedge pushing elements 122, openings 120 being respectively in axial alignment with the wedge receiving slots 100 in the magazine 96, and in turn with the wedge passages 75, 88, and 94.

A pair of elongated guide rod members 124 is provided respectively having their forward ends 126 secured in openings in the boss elements 110 in any suitable manner, as by set screws 128. A pusher plate member 130 is provided having linear bearing portions 132 respectively journaled on the guide rod members 124. A member 134 is secured to the inner surface of the pusher plate member 130 and supports the end 136 of the sleeve member 48. Pusher plate member 130 is adapted to be connected to a suitable piston rod 138 of the conventional hydraulic ram (not shown) for moving pusher plate member 130 and the sleeve member 48 in the forward direction, as shown by arrow 56 and retracting the same, as shown by arrow 58. The rear ends 140 of the slot wedge pushing elements 122 are likewise secured to the member 134 and in the rearmost position of the pusher plate 130, the forward ends 142 of the wedge pushing elements 122 project slightly into the openings 120 in the rear mounting plate 114.

It will now be seen that with the pusher plate member 130, sleeve member 48, push rod 40 and pushing elements 122 in the positions shown in FIGS. 1A and 1B, the prewound multi-turn, skein-type coils 32 may be assembled on the extension portions 18 of the finger elements 12, stator core member 24 assembled on the extension portions 18, and slot wedges 102 loaded in the slots 100 of the magazine 96, as will hereinafter be described. The hydraulic ram is then actuated to move the piston 138 in the direction shown by the arrow 56 and it will be seen that the ends 142 of the wedge pushing elements 122 will engage the slot wedges 102 in the slots 100 of the magazine 96 and thereby move the same axially through passages 94, 88, and the passages 75 defined by the wedge guides 66. Continuous axial movement in the direction shown by the arrow 56 will cause end 46 of the sleeve member 48 to engage stripper member 35 thereby to move the coils 32 axially into the bore 20 of the core 24 and to insert the side portions 34 in the slots 26 over the side portions of the previously inserted coils 28, as above-described. The length of the sleeve member 40 is proportioned so that end 46 engages the stripper member 35 and initiates movement of the same so that the side portions 34 of the coils 32 are inserted in slots 26 slightly in advance of pushing the slot wedges 102 axially into the slots so that the slot wedges are inserted over the side portions 34 immediately following insertion of the side portions 34 of the coils 32, both the coil side portions and the slot wedges axially moving simultaneously.

When the coils 32 and the slot wedges 102 have been fully inserted in slots 26, the hydraulic ram is actuated to retract the piston 138 in the direction 58 thereby retracting the pushing elements 122. When the shoulder 60 of the sleeve member 48 retracts sufficiently to engage end 44 of push rod 40, the stripper member 35 is then retracted in direction 58 to its initial position as shown in FIG. 1A.

Referring now particularly to FIGS. 6, 7 and 8, the slot wedge forming assembly 113 comprises a pair of elongated, axially extending wedge forming plate members 144, 146 in transversely spaced parallel relationship extending axially over the magazine 96 and closely adjacent to its outer periphery so that the axially extending space 148 defined between the facing surfaces of the wedge forming plate members 144, 146 is in axial alignment with a respective slot 100, as best seen in FIG. 6. A pair of punch guide members 150, 152 is provided abutting the upper surfaces of the wedge forming members 144, 146 and secured thereto in any suitable manner as by suitable threaded fasteners shown in dashed lines 154. Punch guide members 150, 152 are likewise transversely spaced-apart to define an axially extending space 156 therebetween which is somewhat narrower than the space 148, but in axial and radial alignment therewith and with a respective magazine slot 100. The wedge forming plate members 144, 146 and the punch guide members 150, 152 are respectively secured to mounting elements 158, 160, which in turn are secured to frame 92 in a suitable manner, as by suitable threaded fasteners 162.

Axially extending grooves 164, 166 are formed in the upper surfaces of the wedge forming plates 144, 146 and respectively communicate with the space 148, thus forming an axially elongated passage for receiving an elongated strip 168 of relatively thin insulating material from which the slot wedges 102 are formed, as will shortly be described. An elongated punch member 170 is provided secured to a mounting member 172. Mounting member 172 is in turn connected to suitable actuating mechanism (not shown) by which the mounting member 172 and the punch 170 may be moved downwardly in the direction shown by the arrow 174 from the position shown in FIG. 7 to the position shown in FIG. 6 in which the punch 170 extends downwardly through the spaces 156, 148, and into a respective magazine slot 100. Actuation of the actuating mechanism in the opposite direction will move the punch 170 upwardly in the direction shown by the arrow 176 to its normal position, as shown in FIG. 7, with its lower edge 178 disposed in space 156 but radially outwardly from the passage 164, 166. It will now be seen that when a blank cut from the elongated strip 168 of insulating material is positioned in the passage 164, 166 and the punch 170 is moved downwardly in the direction shown by the arrow 174, the lower edge 178 of the punch 170 will engage the blank forcing it downwardly in the passage 148, thereby forming the slot wedge 102, and then moving it downwardly into the respective slot 100, as seen in FIG. 6.

Referring additionally to FIGS. 11 and 12, as heretofore mentioned, in accordance with the invention the sides 180, 182 of the slot wedges 102 at their leading ends 184, i.e., the ends which are initially inserted axially into the winding slots 26 in the stator core member 24, are tapered rearwardly, as at 186. In order to provide successive blanks 188 for positioning in the passage 164, 166 from which the slot wedges 102 are formed, the elongated strip 168 of insulating material is successively severed at predetermined intervals, as at 190 by the severing mechanism 192 now to be described.

The rear ends 194, 196 of the wedge forming and punch guide members 144, 146, 150 and 152 are flush, a transverse notch 198 being formed in the rear ends 196 of the punch guide members 150, 152. A cut-off insert member 200 is seated in the notches 198, as shown. Cut-off insert member 200 has a recess 202 formed in its rear edge 204, recess 202 having a forward face 206 and side faces 208, 210 which respectively divergently taper rearwardly outwardly to the rear edge 204. The wedge forming plates 144, 146 respectively have surfaces 212 which taper divergently rearwardly and outwardly from the space 148 to the rear ends 194, the transverse spacing between the tapered surfaces 212 being greater than the transverse spacing btween the tapered surfaces 208, 210 of the recess 202 in the cut-off insert member 200 thereby providing a clearance 214 for a purpose to be hereinafter described.

A cut-off block assembly 216 is provided comprising a mounting member 218, a backing plate member 220 and a cut-off block member 222, the cut-off block member 222 and backing plate member 220 being secured to the mounting member 218 in any suitable manner, as by means of suitable threaded fasteners 224. The backing member 220 has a projection 226 which extends forwardly of the forward surface 228 of the mounting member 218, projection 226 having a forward face 230 and side faces 232, 234 which respectively divergently taper outwardly and rearwardly from the forward face 230 of projection 226 to the forward edge 236 of backing plate 220. The cut-off block member 222 likewise has a projection 238 which at its upper end has its forward face 240 and side faces 242, 244 coextensive with the forward and side faces 230, 232, 234 of projection 226 of the backing plate 220. However, the forward and side faces 240, 242, 244 of the cut-off block projection 238 taper downwardly and inwardly toward the bottom side 246 of the cut-off block 222.

The cut-off block 222 has an axially extending slot 248 formed in its upper surface, the slot being closed by the backing plate 220. Slot 248 communicates between the rear side 250 of the cut-off block 222 and the forward face 240 of projections 238 immediately below projection 226 of the backing plate 220. In the normal position of the cut-off block assembly 216 as shown in FIG. 7, passage 248 communicates with the passage 164, 166 thereby permitting the elongated strip 168 to be advanced through passage 248 and into passage 164, 166. It may be desirable to provide a hardened insert, such as sintered carbide, for the cutting edge of the cut-off block, as at 252.

In the normal position of the cut-off block assembly 216, as shown in FIG. 7, the projection 226 of the backing plate 220 and the insert portion 252 of projection 238 of the cut-off block member 222 mate with the recess 202 in the cut-off insert 200, a clearance 254 being provided between the upper surface of the backing plate 220 and the upper surfaces of notches 198. The cut-off block assembly 216 is connected to suitable actuating mechanism (not shown) for selectively moving the assembly upwardly in the direction shown by the arrow 256 and downwardly in the direction shown by the arrow 258. It will now be readily seen that when the elongated strip 168 of insulating material is advanced through passage 248 and into the passage 164, 166, upward movement of the cut-off block assembly 216 in the direction shown by the arrow 256 will cause the strip 168 to be severed, as at 190 in FIG. 12 thereby to form the slot wedge blank 188 in the passage 164, 166.

Following actuation of the cut-off block assembly 216 to sever the slot wedge blank 188 from the strip 168, punch 170 is actuated downwardly in the direction shown by the arrow 174 thereby to form the blank 188 into the slot wedge 102. It will now be observed that the tapered configuration of the forward and side faces 240, 242, 244 of the projection 238 on the cut-off block member 222 in conjunction with the clearance 214 provided by the faces 212 on the wedge forming members 144, 146 provides a progressively downwardly increasing clearance to accommodate the upward movement of the rear corners 262, 260 of the severed blank 188, as shown by the arrows 264 in FIG. 8 as the punch 170 moves downwardly.

Referring now particularly to FIGS. 9, 10, 13 and 14, it will be seen that the convolutions of wire forming the side portions 34 of the coil 32 are initially disposed in axial alignment in the relatively narrow spaces 27 between the finger elements 18. It will further be seen that the end turns 29 of the coils 28 previously positioned in the core member slots 26 extend axially toward the coils 32 overlaying the respective finger elements 18 about which the coils 32 are draped; auxiliary or starting windings are conventionally mechanically rotationally displaced from the main or running windings thus accounting for the fact that the end turns 29 of the previously emplaced main windings 28 overlay the side portions of the auxiliary or starting windings 32. Thus, as the stripper member 35 is moved axially in direction 56, as above-described, the initially axially aligned convolutions of wire forming the side portions 34 of the coils 32 engage the end turns 29 of the previously emplaced windings 28 before entering the bore 20 of the core member 24 and are resultantly spread out or flattened as shown at 266 in FIG. 14. It will now be recalled that the slot wedges 102 are being advanced axially in the same direction immediately following the advance of the side portions 34 of the coils 32 and as shown in the dashed lines in FIG. 14 the leading ends of the sides 180, 182 of the slot wedges 102 will be within the cross-sectional extent 266 of the side portion wires spread or flattened by engagement with the end turns 29, as above-described. Thus, efforts to utilize conventional straight ended slot wedges were largely unsuccessful, particularly with substantial slot fill, since the forward square corners of the leading straight end of the slot wedges would enter between individual wires of the flattened portion 266 with the result that one or more wires would be on top of rather than underneath the slot wedge. Furthermore, in the case of stator core members having integral insulation thus eliminating cuffed slot insulators, or having straight ended slot insulators, insertion of conventional square ended slot wedges was extremely difficult. However, by tapering the leading edge 184 of the slot wedges 102, as at 186, the tapered leading edges 186 of the sides 180, 182 progressively confine the wires in the portion 266, there being no sharp corners which formerly tended to slice between wires which happened to be at the outer edges of the spread portion 266, and the tapered leading ends smoothly enter the slots.

Referring now particularly to FIGS. 15, 16 and 17, it has been found that the tendency for the leading edge corners of the sides 180, 182 of the slot wedges 102 to slice between individual turns of the spread portions 266 can be further reduced by forwardly and outwardly tapering the forward ends 268 of the web portions 71 of the web guide elements 66, as at 270. This forward and outward tapering 270 of the web portion 71 permits the leading tapered edges 186 to spread somewhat further as the wedge 102 is moved outwardly from the wedge guides 66, as best seen in FIG. 17, thus insuring that the tapered leading edges 186 confine all of the wires of the flattened portion 266 of the side portions 34.

While there have been described above the principles of this invention in connection with specific apparatus, it is to be clearly understood that this description is made only by way of example and not as a limitation to the scope of the invention.

What is claimed is:

1. Apparatus for inserting prewound coils and slot wedges into the slots of an internally slotted dynamoelectric machine core member comprising: a mounting member; a plurality of elongated axially extending finger elements, said elements being radially equally spaced-apart defining axially extending spaces therebetween and forming a bore; each of said finger elements having one end secured to said mounting member and having a portion extending axially outwardly therefrom, said extension portion being adapted to receive prewound coils to be inserted in said core member slots with each coil having one end turn disposed in said bore and its sides extending outwardly through said spaces between predetermined pairs of said extension portions, said extension portions being adapted to engage the inner extermities of the teeth of said core member which define said slots and with said spaces in axial alignment with and communicating with respective slots; a stripper member mounted for axial movement in said bore; means for moving said stripper member axially through said bore within said extension portion thereby to push said coil end turns axially along the inner surfaces of the respective predetermined pairs of extension portions whereby said coil sides are inserted in the respective core slots; a plurality of elongated axially extending slot wedge guide elements respectively in axial and radial alignment with said finger elements and disposed radially outwardly of said finger elements, said guide elements being radially equally spaced-apart with spaces therebetween in axial and radial alignment with said finger element spaces thereby to guide slot wedges into said core member slots over the coil sides therein, each of said guide elements having one end secured to said mounting member and having a portion extending axially outwardly therefrom toward said core member; a slot wedge magazine mounted on said mounting member for rotation about the axis of said bore and extending rearwardly from said one end of said guide elements, said magazine member having a plurality of elongated, axially extending, radially outwardly facing slots formed therein, for receiving slot wedges to be inserted, said slots being radially equally spaced-apart and equal in number to said finger and wedge element spaces, said slots being in axial alignment with said guide element spaces in at least one rotational position of said magazine; means for selectively rotating said magazine thereby successively to position each of said slots thereof at a predetermined location; means disposed radially outwardly from said magazine and radially aligned with said location for receiving an elongated strip of flat, relatively thin insulating material in spaced axially parallel relationship with the respective magazine slot; means for successively servering said strip at predetermined intervals thereby successively to form individual slot wedge blanks of predetermined length in said receiving means, said severing means forming the forward and rear ends of successive blanks with edges which respectively taper rearwardly and outwardly to the side edges of said blank and with said forward ends facing said guide element; means cooperating with said receiving means for forming the blanks therein into a generally U-shaped cross-section thereby forming a slot wedge with the sides thereof tapered rearwardly at said forward end and for moving the formed wedge from said receiving means into the respective slot of said magazine; a plurality of axially elongated pushed elements respectively having distal ends, said pusher elements being radially equally spaced-apart about the axis of said bore an dequal in number to said wedge element spaces, said pusher elements being respectively in axial alignment with said magazine slots in said one position of said magazine and mounted for axial movement therethrough; and means for moving said pusher elements axially through said magazine slots and guide element spaces whereby said distal ends of said pusher elements respectively push said slot wedges from said magazine slots through said guide element spaces so that said forward ends enter said core slots over the coil sides therein.

2. The apparatus of claim 1 wherein said severing means includes means for forming said ends with a transverse center edge portion joined to said side edges by said tapering edges, said center edge portion having a width generally equal to the width of the bottom of the formed slot wedge.

3. The apparatus of claim 2 wherein said severing means is disposed rearwardly of said receiving and forming means.

4. The apparatus of claim 1 wherein said receiving means comprises a pair of axially extending transversely spaced-apart plate members with the space therebetween in radial alignment with the respective magazine slot, said strip being disposed axially over said last-named space, and wherein said forming means comprises an axially elongated punch member movable radially inwardly through said last-named space and into the respective magazine slot.

5. The apparatus of claim 1 wherein said receiving means have a rear end remote from said guide elements and wherein said severing means comprises stationary cut-off means at said rear end of said receiving means and movable cut-off means movable radially with respect to said stationary cut-off means and cooperating therewith thereby to sever said strip, said movable cut-off means having an opening forward therethrough for receiving said strip, said movable and stationary cut-off means being formed to provide said forward ends of said blank with a transverse center edge portion joined to said side edges by said tapering edges, said center edge portion having a width generally equal to the width of the bottom of the formed slot wedge.

6. The apparatus of claim 5 wherein said stationary cut-off means has a recess formed therein with a transverse bottom face and side faces which respectively divergently taper rearwardly to said rear end, and wherein said movable cut-off means comprises a block having a bottom side and a forward side facing and closely adjacent said rear end of said receiving means, said forward side of said block having a projection formed thereon with an upper side spaced outwardly from said bottom side of said block, said opening extending through said projection adjacent said upper side thereof, said projection having a transverse forward face and side faces which respectively divergently taper rearwardly to said forward side, said forward and side faces of said projection adjacent said opening respectively closely mating with said bottom and side faces of said stationary cut-off means whereby upward movement of said block with respect to said stationary cut-off means severs said strip to provide said ends, staid stationary and movable cut-off means overlaying the respective slot in said magazine, said forward and side faces of said projection respectively tapering rearwardly and inwardly toward said bottom side of said block thereby providing increasing clearance with said bottom and side faces of said stationary cut-off means as said block is moved upwardly to accomodate inward movement of the outer corners of said rear end of said blank in response to formation of said slot wedge by said forming means.

7. The apparatus of claim 6 wherein said receiving means comprises a first pair of axially extending, transversely spaced-apart plate members closely adjacent said magazine and with the space therebetween in radial and axial alignment with the respective magazine slot, the outer sides of said first plate member respectively having axially extending grooves formed therein communicating with said space, a second pair of axially extending, transversely spaced-apart plate members abutting said outer sides of said first plate members, said second plate members, said second plate members respectively overlaying said grooves thereby providing an elongated axially extending passage for receiving said strip with said strip therein overlaying the space between said first plate members, said first and second plate members having rear ends in general alignment, the sides of said first plate members which define the space therebetween being respectively joined to said rear ends thereof by faces which respectively divergently taper rearwardly, the rear ends of said second plate member having a transverse notch formed therein communicating with their sides which abut said first plate member, said stationary cut-off means comprising a member seated in said notch and having said recess formed therein, said first plate member faces being spaced-apart by distances respectively greater than the spacing of the side faces of said recess thereby providing a further clearance for accommodating inward movement of the outer corners of said rear end of said blank in response to formation of said slot wedge by said forming means, said block being normally positioned with said opening in axial alignment with said passage whereby said strip may be moved into said passage, and wherein said forming means comprises an axially elongated punch member movable radially inwardly through said first and second plate member spaces and into the respective magazine slot whereby said blank in said passage is formed by said punch into a slot wedge between said first plate member sides and then inserted into the respective magazine slot.

8. The apparatus of claim 1 wherein said guide elements respectively have a generally I-shaped cross-section with radially extending web sections and top and bottom flange sections, said guide element spaces being resepctively defined between the web and flange sections of adjacent pairs of guide elements, said guide elements having distal ends extending toward said core member, each of said web sections adjacent its distal end being tapered divergently outwardly and convergently forwardly thereby to permit spreading of the forward end of the respective slot wedge as it it exists from the respective guide element space.

References Cited

UNITED STATES PATENTS

| | | | |
|---|---|---|---|
| 3,230,611 | 1/1966 | Moore | 29—596 |
| 3,377,690 | 4/1968 | Eminger | 29—596 X |
| 3,402,462 | 9/1968 | Walker et al. | 29—596 |

JOHN F. CAMPBELL, *Primary Examiner.*

C. E. HALL, *Assistant Examiner.*

U.S. Cl. X.R.

29—596